US007269900B2

(12) United States Patent
Moriya et al.

(10) Patent No.: US 7,269,900 B2
(45) Date of Patent: Sep. 18, 2007

(54) METHOD FOR ASSEMBLING A PLURALITY OF VEHICLE BODY TYPES

(75) Inventors: Fumio Moriya, Suzuka (JP); Takehiro Kouno, Sayama (JP); Kiyoshi Ikumi, Sayama (JP); Hiroshi Miyashita, Sayama (JP); Haruji Yoshida, Suzuka (JP); Tatsuaki Son, Suzuka (JP); Kouichi Hosono, Suzuka (JP); Masakazu Kanda, Suzuka (JP); Gengo Kajima, Suzuka (JP); Tomoyoshi Takeuchi, Suzuka (JP); Masanori Yoshida, Suzuka (JP); Jyun Toyoda, Suzuka (JP); Kenji Tatsuda, Suzuka (JP); Yasuo Miyaoka, Sayama (JP); Michinao Iwami, Sayama (JP); Ikuo Kanazawa, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/117,404

(22) Filed: Apr. 29, 2005

(65) Prior Publication Data

US 2005/0198803 A1    Sep. 15, 2005

Related U.S. Application Data

(62) Division of application No. 10/130,296, filed on May 30, 2002, now Pat. No. 6,918,168.

(30) Foreign Application Priority Data

Dec. 28, 1999  (JP) ................................. 11-377329
Sep. 22, 2000  (JP) ............................. 2000-289492

(51) Int. Cl.
*B62D 65/00*  (2006.01)
*B23P 11/00*  (2006.01)

(52) U.S. Cl. .......... 29/897.2; 29/783; 29/791; 29/429; 29/430; 209/44.4; 700/95; 700/117

(58) Field of Classification Search ........... 29/430, 29/711, 783, 791, 897.2, 429, 786, 793; 209/705, 209/583, 44.4, DIG. 942, 703; 700/95, 97, 700/99, 100, 117
See application file for complete search history.

(56) References Cited

U.S. PATENT DOCUMENTS

| 4,058,217 | A | 11/1977 | Vaughan et al. |
| 4,958,292 | A | 9/1990 | Kaneko et al. |
| 5,152,050 | A | 10/1992 | Kaczmarek et al. |
| 5,325,972 | A | 7/1994 | Prydtz et al. |
| 6,772,027 | B2 | 8/2004 | Kurihara ............. 700/99 |

FOREIGN PATENT DOCUMENTS

| JP | 4-354632 | 12/1992 |
| JP | 6-218631 | 8/1994 |

(Continued)

*Primary Examiner*—Jermie E. Cozart
(74) *Attorney, Agent, or Firm*—Arent Fox LLP

(57) ABSTRACT

A production organizing method and a method and apparatus for assembling vehicle body are provided. The production line organizing method comprises the steps of classifying all parts for all types of vehicles to be assembled into groups of main part, synchronous subparts, and non-synchronous subparts, and the manhour for the non-synchronous subparts are assigned to the difference in manhours for assembly of main parts and synchronous subparts. In addition, a vehicle body assembly method and a vehicle body assembly line are also provided, which are capable of reducing a length of a main line and increasing the productivity by classifying all of the parts used for all vehicle types into three groups of main parts and two groups of subparts including non-synchronous main parts and subparts, and by assembling and storing the non-synchronous main parts and subparts in the separate section and supplying the sub-assembled non-synchronous subparts to the main line when necessary.

2 Claims, 11 Drawing Sheets

FOREIGN PATENT DOCUMENTS

| | | |
|---|---|---|
| JP | 6-277966 | 10/1994 |
| JP | 7-56997 | 3/1995 |
| JP | 7-96448 | 4/1995 |
| JP | 07-168884 | 7/1995 |
| JP | 11-347859 | 12/1999 |
| JP | 2000-141047 | 5/2000 |

Fig. 2

|  | VEHICLE TYPE: A | VEHICLE TYPE: B | VEHICLE TYPE: C | VEHICLE TYPE: D | VEHICLE TYPE: E |
|---|---|---|---|---|---|
| PART: 1 | ○ |  |  | ○ | ○ |
| PART: 2 |  | ○ | ○ | ○ |  |
| PART: 3 | ○ | ○ | ○ | ○ | ○ |
| PART: 4 |  | ○ |  | ○ | ○ |
| PART: 5 | ○ | ○ | ○ | ○ | ○ |
| PART: 6 | ○ |  |  | ○ | ○ |
| PART: 7 |  |  | ○ | ○ |  |
| PART: 8 | ○ | ○ | ○ | ○ | ○ |

| | VEHICLE TYPE: A | VEHICLE TYPE: B | VEHICLE TYPE: C | |
|---|---|---|---|---|
| PART: 1 | O | O | | MB2,MB3 |
| PART: 2 | O | | O | MB2,MB3 |
| PART: 3 | O | O | O | MB1 |
| PART: 4 | O | O | | MB2,MB3 |
| PART: 5 | O | O | O | MB1 |
| PART: 6 | O | O | | MB2,MB3 |
| PART: 7 | O | | O | MB2,MB3 |
| PART: 8 | O | O | O | MB1 |

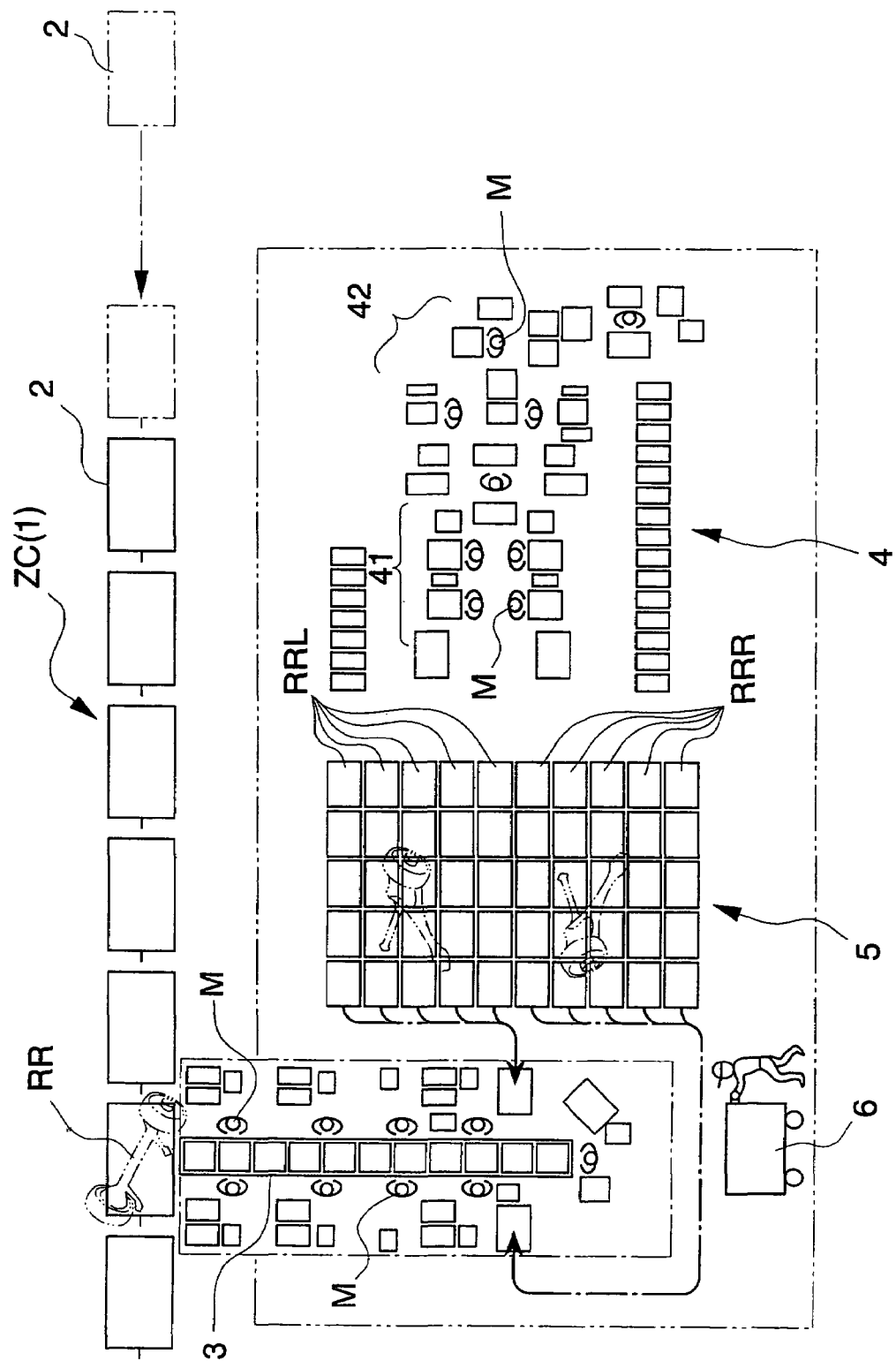

METHOD FOR ASSEMBLING A PLURALITY OF VEHICLE BODY TYPES

CROSS-REFERENCE TO RELATED APPLICATION

This is a Divisional of application Ser. No. 10/130,296, filed on May 30, 2002 now U.S. Pat. No. 6,918,168. The disclosure of the prior application is hereby incorporated by reference herein in its entirety.

BACKGROUND OF THE INVENTION

1. Field of the Invention

The present invention relates to a method for organizing a production line, for example, a method for organizing a production line capable of producing a plurality of types of vehicles by a single production line, and in particular, relates to a method for organizing a production line capable of providing efficient production by absorbing differences in manhour due to the type of vehicles and to a vehicle body assembly method and a vehicle body assembly line, capable of reducing the length of the single line and exhibiting a high productivity.

2. Background Art

A conventional design concept for organizing the flow production system of, for example, vehicles is disclosed in Japanese Unexamined Patent Application, First Publication No. Sho 61-21870, in which two assembly lines including a main line for integrating main parts and a sub-line for integrating subparts are constructed.

A production line design for producing a plurality of types of vehicle mixed on a single line is disclosed in Japanese Patent (Granted) Publication No. 2920801. The concept of the above patent is known as a production line whose assembly speed is changed suitably for producing a plurality of vehicle types on a single line with a favorable production efficiency.

As described above, a plurality of types of vehicle bodies are usually assembled by two production lines. In most cases, these two lines include the main line for assembling the main components and a subsidiary line for supplying the components collectively to the main line after assembling the parts into the sub-assembled components.

For example, car bodies, conveyed to an assembly line after the coating process, are assembled while passing through the main line, which comprises an installation line, an underside assembly line and so on. In assembling the car body in the main line, the sub-assembled components, which are sub-assembled in the sub-assembly line connected to the main line, are supplied to the main line.

In conventional production lines, it is inevitably necessary to design the production line to be able to produce the type of vehicle having the largest number of parts, when taking various factors such as forms of production, equipment, specifications, and the number of parts into consideration. Thus, the length of the main line increases, which results in increasing the redundant manhours and unnecessary utility expenses, and increasing the production cost.

That is, in order to produce a plurality of types of vehicles having different numbers of parts on the same line, the manhours required for one particular type of vehicle differ from those for other vehicles. Accordingly, when a type of vehicle having a small number of parts is conveyed on the main line, some of the manpower available for another type of vehicle having a larger number of parts becomes redundant.

One of the purposes of the present invention is to provide a method of organizing a production line, capable of producing a plurality of types of vehicles efficiently while absorbing differences in manhour due to the vehicle type.

Recently, the production of vehicles has changed from large scale production of a few types of vehicles to the small scale production of multiple types of vehicles, it has been a general trend to produce multiple types of vehicles on the same production line in response to diversified consumer demands. Accordingly, there has been a tendency for the production lines to become longer.

That is, considering the assembly forms, equipment, specifications, and the number of parts or components to be assembled, each of which differs for each vehicle type, the length of a production line for producing multiple types of vehicles must be determined based on the type of vehicle using the largest number of parts. Therefore, the length of the production line for producing a multiple types of vehicles inevitably becomes long, which results in increasing the supplementary facilities, substantially reducing the productivity, and increasing the costs.

Furthermore, since a variety of vehicles comprising different numbers of parts and components are assembled on the same line, the number of manhours varies according to the type of vehicle. When a type of vehicle having a small number of parts is conveyed, the operators required for assembling a type of vehicle comprising a larger number of parts become redundant, and the productivity is reduced. Consequently, this redundant labor causes a reduction of the productivity and an increase of the cost.

SUMMARY OF THE INVENTION

It is therefore an object of the present invention to provide a production line organizing method, a vehicle assembling method, and a vehicle assembly line, capable of reducing the length of the main assembly line and of improving the productivity.

In order to solve the above problem, the first aspect of the present invention is to provide an assembly line organizing method, capable of producing a plurality of types of vehicles on a single line, comprising the steps of classifying all vehicle parts into main parts and subparts by classifying parts which are common to all types of vehicles as main parts and classifying remaining parts other than the main parts as subparts, classifying all subparts into synchronizing subparts and non-synchronizing subparts by classifying subparts which can be assembled in synchronous with the assembly in the main line as synchronizing subparts and classifying other remaining subparts as non-synchronizing subparts, and allocating all integrating and assembly manhours of the non-synchronizing subparts classified in the above subparts classification step to at least either the difference in manhours for the assembly of the main parts depending on the vehicle type or the difference in manhours for the assembly of the synchronizing subparts depending on the vehicle type.

By forming the above constitution, redundant manhours generated by the difference in manhours for the assembly of the main parts depending on vehicle type or the difference in manhours for the assembly of the subparts depending on the vehicle type can be assigned to the manhour for the assembly of non-synchronizing subparts.

According to the second aspect of the present invention, in the above production line organizing method, all integrating and assembly manhour of said non-synchronizing subparts are abridged and a new assembly manhour is defined by this abridged manhours on the assumption that non synchronizing subparts can be assembled in a more efficient manner by abridging the assembly, and the production line organizing method comprises the steps of allocating the new assembly manhour to either the manhour difference of the main parts due to the vehicle type or the manhour difference of the synchronizing subparts due to the vehicle type.

By forming the above constitution, the new integrating and assembly manhours of all non-synchronizing subparts are defined by collecting and abridging into more efficient assembly manhours, and the new assembly manhours can be assigned to either the difference of manhours in assembly of the main parts due to the vehicle type or the difference of manhours in assembling the synchronizing subparts due to the vehicle type.

The third aspect of the present invention is to provide an assembly method of a plurality of vehicle bodies by assembling main parts and subparts (for example, a set of subparts B in the embodiment) for a vehicle body (for example, vehicle body 2 in the embodiment) while conveying the vehicle bodies after coating comprising the steps of: assembling in a main process first main parts (for example, main part MB 1), which are common to all types of vehicle bodies, and, among main parts (for example, main parts MB in the embodiment) which are not common to all types of vehicles, second main parts (for example, main parts MB 2), which are not common to all types of vehicles but whose assembly can be accommodated while absorbing a differences in assembly manhours due the vehicle type; and assembling in a subprocess third main parts (for example, third main parts in the embodiment), which are not common to all types of vehicles and whose assembly cannot be accommodated by absorbing the difference in manhours due to the vehicle type, as a unit of parts; supplying to the main process after assembly first subparts (for example, subparts SB1 in the embodiment), which can be assembled synchronously with the main line, after assembly in a sub-main process; storing after subassembly by a non-synchronous process subparts (for example, subparts SB2 in th embodiment) which cannot be assembled synchronously with the main line, and said third main parts, whose assembly cannot be accommodated by absorbing differences due to the vehicle type; and supplying said sub-assembled parts to the sub-main process and to the main process.

By the above constitution, the changes in the assembly manhours for different vehicle types can be absorbed in the subprocess without affecting the production flow in the main process. In the subprocess, the subparts, which can be common to all vehicle types, are assembled synchronously with the main process, and the subparts which cannot assembled synchronously and the subassembled main parts whose assembly cannot be accommodated within the main process are stocked for supplying to the main process and the sub-main process.

The differences due to the vehicle type of the second main parts, whose assembly can be accommodated with the main line, are absorbed in various ways such as use of the assembly jigs, improvement of the assembly operation, and adoption of an automated systems and unification of the specifications.

By the above constitution, the time for assembling the second main parts MB2 whose assembly can be accommodated by absorbing the difference in manhours due to the vehicle type is shortened by considering the assembly forms, equipment and specifications, that is, by the use of the assembly jigs, improvements in the assembly operation, reduction of man-hours by adoption of automated systems, and unification of the specifications, it is possible to quickly bring the operator to a high level of skill and to increase the productivity.

The other aspect of the present invention provides an assembly line of a plurality of types of vehicle bodies after coating for assembling main parts and subparts while conveying the vehicle bodies comprising: a main line for assembling first main parts, which are common to all types of vehicle bodies, and second main parts, which are not common to all vehicle types but can be assembled while absorbing differences in manhours in the assembly operation due to the vehicle type; a sub-line for unitizing and assembling the third main parts, which are not common to all types of vehicles and which cannot absorb the differences in manhours due to the vehicle type; wherein the sub-line comprises a sub-main line, connected to the main line for supplying first subparts, which can be assembled synchronously with the main line, after assembly in a sub-main line; a non-synchronous part manufacturing area, in which subparts which cannot be assembled synchronously with the main line and main parts which cannot be assembled while absorbing the differences in manhours due to the vehicle type; and a storage area which stores subparts assembled in the non-synchronous part manufacturing area and main parts, which cannot absorb the differences in manhours due to the vehicle type, and supplies these parts in the storage area to the sub-main line or to the main line.

By the above constitution, the main parts, which are common to all vehicle types and the main parts which are not common to all vehicle types but can be assembled by absorbing the differences in manhours due to the vehicle type are assembled in the main line. The main parts, which are not common to all vehicle types and which cannot absorb the differences in manhours due to the vehicle types, and the subparts are assembled in the sub-line, wherein the main parts, which can be assembled synchronously with the main line, are assembled in the sub-main line and are supplied to the main line. In addition, the subparts which cannot be assembled synchronously with the main line and the main parts whose assembly cannot be accommodated because of the differences in manhours due to the vehicle types are stocked in the storage area and they are supplied to the main line or the sub-main line when necessary.

BRIEF DESCRIPTION OF THE DRAWINGS

FIG. 2 is a diagram explaining the relationship between the parts and the vehicle types in one zone.

FIG. 14 is a diagram explaining the line layout of the assembly line according to one embodiment of the present invention.

DETAILED DESCRIPTION OF THE INVENTION

Hereinafter, an embodiment of the present invention is described with reference to the attached drawings.

The constitution of the assembly line and parts to be assembled are explained referring to an example of the assembly line for assembling vehicle bodies.

Figure 1:
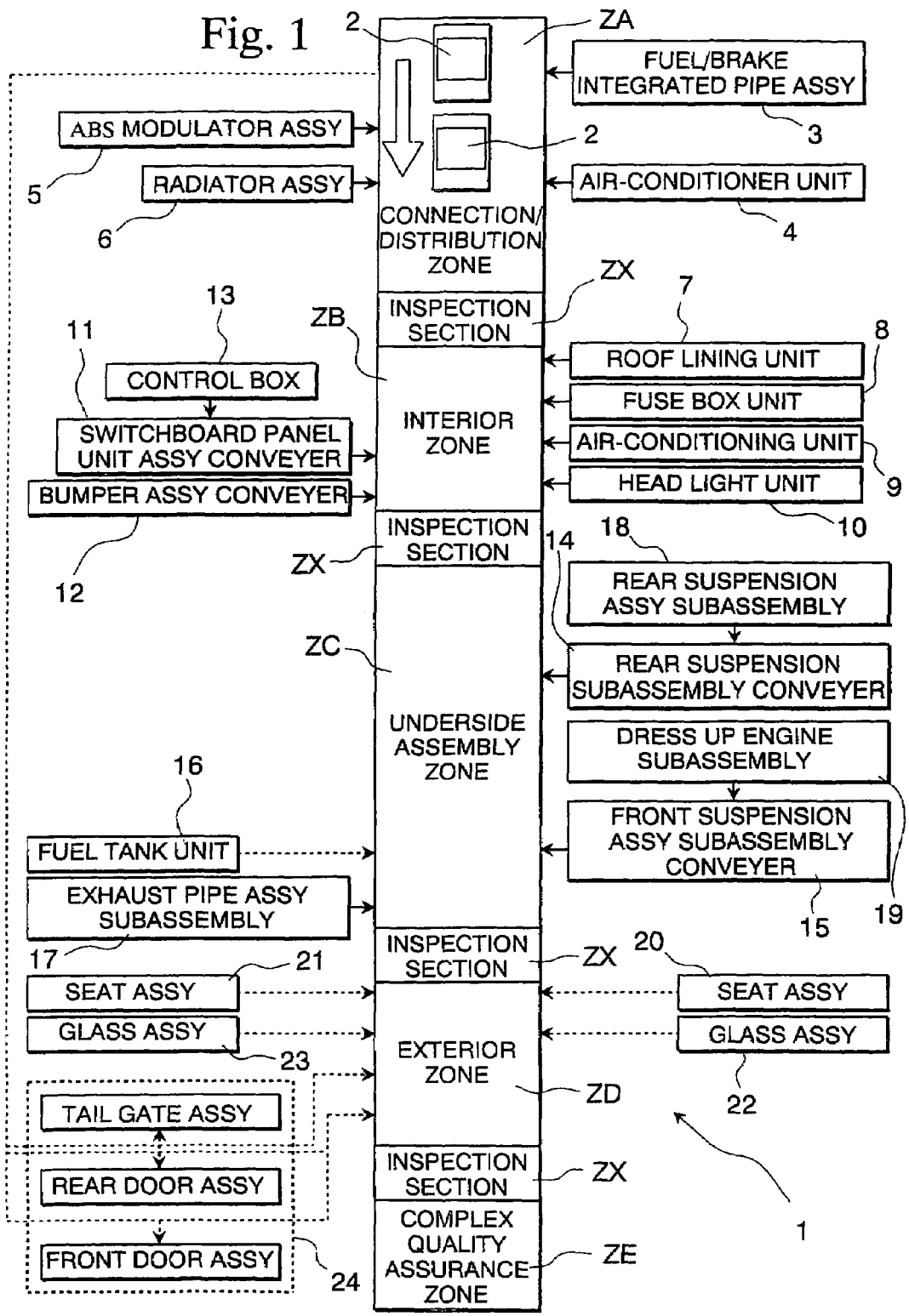
FIG. 1 is a diagram showing a view of the entire vehicle body assembly line organized according to one embodiment of the present invention.

FIG. 1 is a diagram showing the entire view of the vehicle body assembly line organized according to one embodiment of the present invention. In FIG. 1, reference numeral 1 denotes a main line, which is used for assembling various parts for a plurality of types of vehicle bodies 2 (product) supplied after being coated in the coating process.

This main line 1 in practice comprises a connection/distribution zone ZA, an interior zone ZB, a underside assembly zone ZC, an exterior zone ZD, and an complex quality assurance zone ZE. The vehicle body after being assembled in the main line 1 is transferred to the subsequent process for inspection. The main line 1 therefore corresponds to the main process. Here, it is noted that three inspection sections ZX are provided after respective zones ZA, ZB, and ZC in addition to the complex quality assurance zone ZE.

Various supply lines are connected to the connection/distribution zone ZA such as a fuel/brake unified pipe assembly sub-line 3, an air-conditioner condenser unit supply line 4, an ABS modulator assembly sub-line 5, and a radiator assembly sub-line 6, in order to respectively install a fuel/brake unified pipe assembly, an air-conditioner condenser unit, an ABS modulator assembly, and a radiator assembly. These sub-lines are operated while moving synchronously with the main line 1.

Various supply lines are also connected to the interior zone ZB such as a roof lining unit sub-line 7, a fuse unit box sub-line 8, an air-conditioner unit sub-line 9, a headlight unit sub-line 10, and a switchboard panel unit assembly sub-line 11, a bumper assembly conveyer sub-line 12, in order to respectively install a roof lining unit, a fuse unit box, an air-conditioning unit, a head light unit, a switchboard panel with soft lining assembled on a conveyer, and a bumper assembled on a conveyer. The above-described sub-lines are operated while moving synchronously with the main line 1. Here, a control box sub-line 13, which moves non-synchronously with the main line 1, is connected to the above-described switchboard panel unit assembly conveyer line 11. It is noted that control boxes for all types of vehicles are assembled in this control box sub-line 13.

Various sub-lines are connected to the underside assembly zone ZC such as a rear suspension subassembly conveyer sub-line 14, a front suspension assembly subassembly conveyer sub-line 15, a fuel tank unit sub-line 16, and an exhaust pipe assembly subassembly sub-line 17, in order to install a rear suspension sub-assembled into subassembly on a conveyer, a front suspension sub-assembled into subassembly on a conveyer, a fuel tank unit, and a exhaust pipe assembly subassembly.

Here, a rear suspension assembly subassembly sub-sub-line 18 is connected to the rear suspension subassembly conveyer sub-line 14, and a dressed engine subassembly sub-sub-line 19 is connected to the front suspension assembly subassembly conveyer sub-line 15. It is noted that the dressed engine subassembly means an assembly of an engine and a transmission.

The above-described rear suspension assembly subassembly sub-line 18 assembles rear suspension assemblies for all types of vehicles non-synchronously with the main line 1 for supplying them to the above-described rear suspension small assembly conveyer sub-line 14. The dressed engine subassembly sub-sub-line 19 assembles all vehicle types of dressed engines non-synchronously with the main line 1 for supplying them to the above-described front suspension subassembly conveyer sub-line 15.

Various sub-lines such as seat assembly sub-lines 20 and 21 and glass assembly sub-lines 22 and 23 are connected to the exterior zone ZD, in order to install the front and rear seat assemblies and the front and rear glass assemblies. These sub-lines are synchronous with the main line 1.

Finally, in the complex assurance zone ZE, various operations are carried out such as a coolant filling operation, mounting of the battery, a fuel filling operation, and confirmation of the engine start.

In addition, in the exterior zone ZD, a front door assembly, a rear door assembly, and a tail gate assembly are installed, which are removed in the connection/distribution zone ZA and assembled in the door and tail gate assembly lines 24. It is noted that there are other sub-sub-lines which are not shown in FIG. 1, in addition to the main line 1, sub-lines 3 to 12, 14 to 17, and 20 to 23, and sub-lines 13, 19, and 18.

The above-described zones are classified by the functions of the assembly operations, and an object of the functional classification of the operations is to make it possible to prevent disassembly and reassembly operations by executing quality assurance at each inspection section ZX provided after each assembly zone from ZA to ZD. For example, both ends of a trunk grid switch cable are fixedly connected in the connection/distribution zone ZA. However, since the action of a trunk grid switch cable is confirmed by inspecting the working function of the cable in the inspection section ZX after the connection/distribution zone ZA, it is possible to eliminate a disassembly process of the assembled body formed in the zone ZA in the following zone for fixing errors.

Concretely speaking, in the conventional production line, one operator in charge of an operation carries out the operation such that, for example, when one operator attaches the front end of the cable and the other operator attaches the back end of the cable, if the first operator attaches the front end without providing slack, this defective attachment may go unnoticed until it is found by another operator and, reassembly may be required when it is found. However, since an inspection section is provided after each assembly zone in the present assembly line, the assembly operations executed in one assembly zone can be completed in that assembly zone without generating defects in later assembly zones.

When two types of vehicle bodies 2 are conveyed to an assembly zone, a difference arises in the manhours for assembly and the number of parts by the types of vehicles as shown in FIG. 2.

Practically speaking, the vehicle type D comprises eight parts from No. 1 to No. 8. However, the vehicle type A comprises five parts not including No. 2, No. 4 and No. 7, and the vehicle B comprises five parts not including No. 1, No. 6 and No. 7. Furthermore, the vehicle type C does not include No. 1, No. 4 and No. 7, and the vehicle type E does not include No. 2 and No. 7. The number of parts differs by the vehicle type due to differences in equipment.

In the present zone, the parts No. 3, No. 5, and No. 8 are common to all vehicle types from A to E, but the other parts No. 1, No. 2, No. 4, No. 6, and No. 7 are not common to the vehicle types from A to E.

Similar to the present zone, there are the common parts and non common parts in other respective zones. Accordingly, if the assembly line is organized so as to be able to produce a vehicle type having the greatest number of parts, an assembly operation of a vehicle having the small number of parts will generate redundant operators.

Now, a production line organizing method of the present invention will be described below with reference to the flowchart shown in FIG. 3, and FIGS. 4 to 8.

Figure 3:
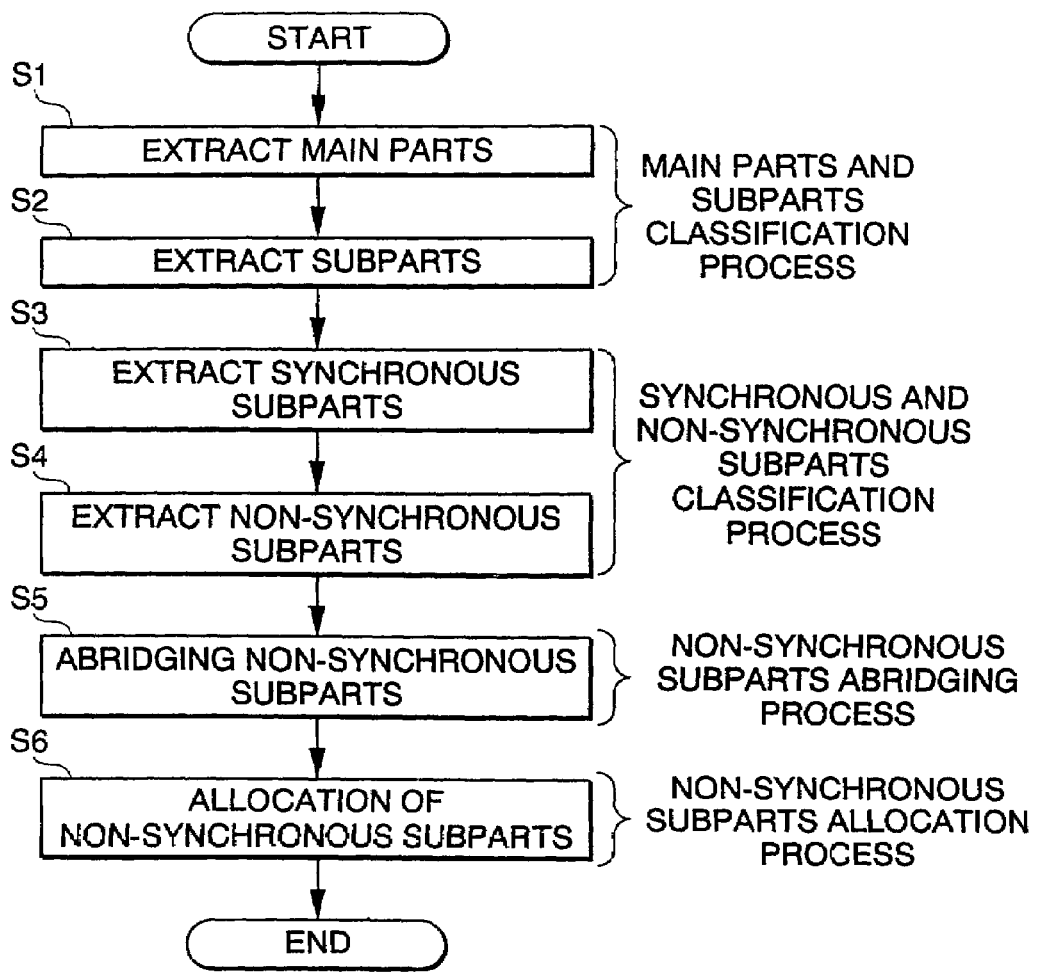
FIG. 3 is a flowchart showing a procedure for organizing the production line according to one embodiment of the present invention.

As shown in FIG. 3, in any zone, common parts common to all vehicle types are classified as main part MB (step S1), and other parts are classified as subparts SB (step S2). A main and subparts classification process is constituted by the step S1 and step S2. Concretely, as shown by the bar graph in FIG. 4, the parts are classified into the common parts common to all vehicle types A to E and subparts not common to all vehicle types A to E. In the example shown in FIG. 2, the parts No. 3, No. 5 and No. 8 are classified as the main parts, and parts No. 1, No. 2, No. 4, No. 6 and no. 7 are classified as the subparts.

Figure 4:
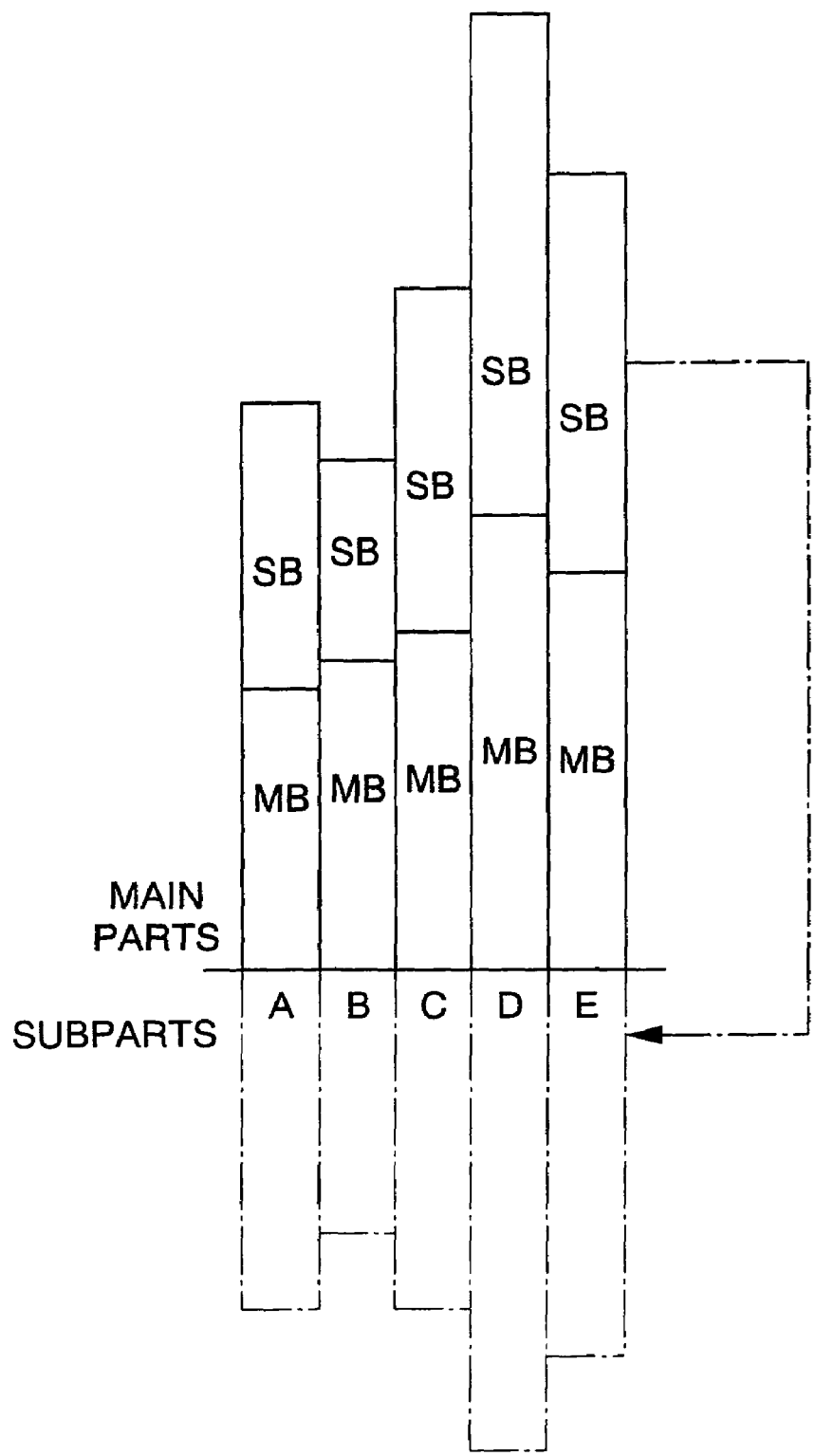
FIG. 4 is a graph showing the manhours required for assembly of various types of vehicles in one zone.
Figure 7:
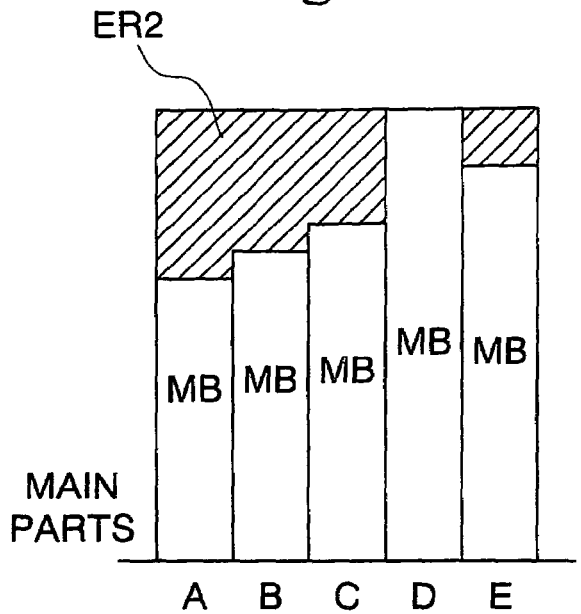
FIG. 7 is a graph showing the manhours required for the main parts at a zone

The dashed lines in FIG. 4 illustrate the number of subparts SB classified for respective vehicles in the subpart side. As shown in the figure, the number of the main parts MB differs by types of vehicles, so that the manhours required for assembly of the main parts varies depending on the vehicle type. The hatching in FIG. 7 shows the differences of assembly manhours depending on the vehicle type.

Subsequently, in step S3 shown in FIG. 3, subparts that can be assembled synchronously with the main line are classified as synchronous subparts SB1, and in subsequent step S4, the remaining subparts, other than the synchronous subparts, are classified as the non-synchronous subparts SB2. The combination of step S3 and step S4 constitutes the classification process to classify subparts into synchronous subparts and non-synchronous subparts.

Figure 5:
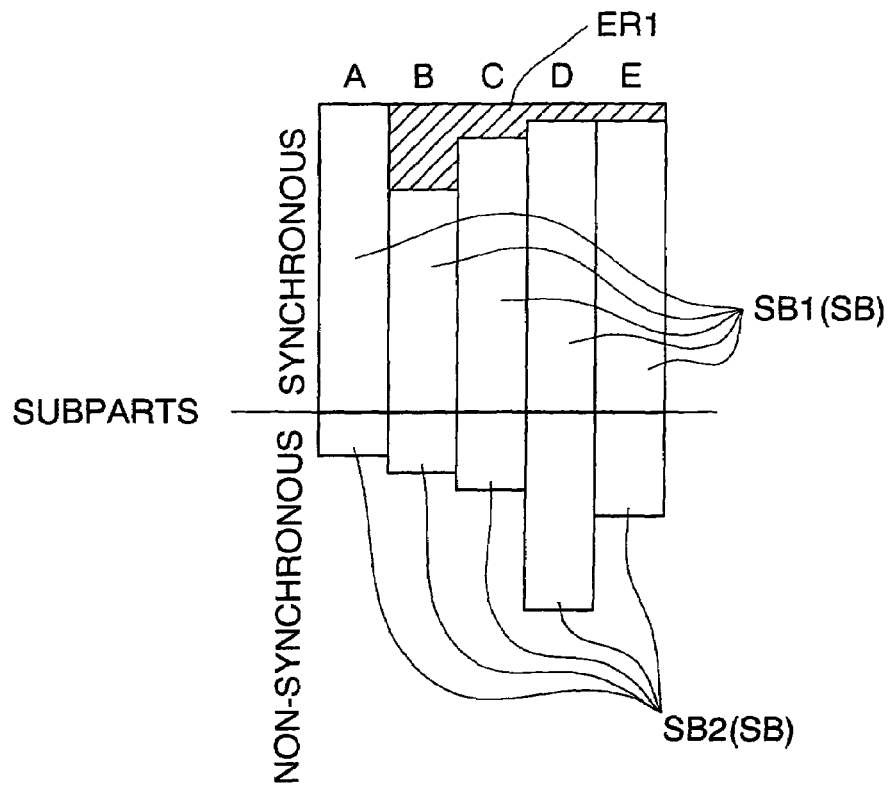
FIG. 5 is a graph showing the manhours required for assembly of subparts for various types of vehicles at a zone.

Practically speaking, as shown in FIG. 5, which is a bar graph of the manhours required for assembling subparts, subparts should be divided into two groups, in which one includes synchronous subparts SB1 which can be assembled in synchronism with the main parts, and another includes non-synchronous subparts which cannot be assembled in synchronism with the main parts. The number of synchronous subparts SB1 differs depending on the vehicle type so that the manhours for the assembly of the synchronous subparts SB1 is not always the same and varies depending on the vehicle type. The hatching lines in FIG. 5 show the differences of manhours due to the vehicle type.

In step S55 shown in FIG. 3, the non-synchronous subparts SB2 are collected as a group of subparts irrespective of the vehicle type as a block of new non-synchronous subparts SB3 (non-synchronous subparts collection process). In practice, the manhours for assembling the subparts of respective vehicles are shown in FIG. 6 as a bar graph (the longitudinal axis is operating hours as manhours), and the manhours for non-synchronous subparts SB2 are collected, independently of the vehicle type, as a block of non-synchronous subparts SB3 as shown below the horizontal borderline of FIG. 6.

Subsequently, in step S6 in FIG. 3, the total manhours for the collected non-synchronous subparts SB3 for all types of vehicles are abridged for obtaining new total manhours for all non-synchronous subparts SB3. These new total manhours are allocated to the manhour differences due to the change of the assembly manhours of the main parts MB depending on the vehicle type in the main line 1 and to the manhour differences due to the change of the assembly manhours of the synchronous subparts SB1 depending on the vehicle type in the sub-line 1 and the flow is completed.

It is noted, however, that when the total manhours for the non-synchronous subparts SB2 are not so large and the above total manhours for the non-synchronous subparts SB2 can be simply allocated to the differences in manhours of the main parts or the synchronous subparts, it is not necessary to allocate the above-described total manhour to both differences in assembly manhours of the main parts and synchronous subparts. The non-synchronous subparts allocation process is constituted by this step S6.

Figure 6:
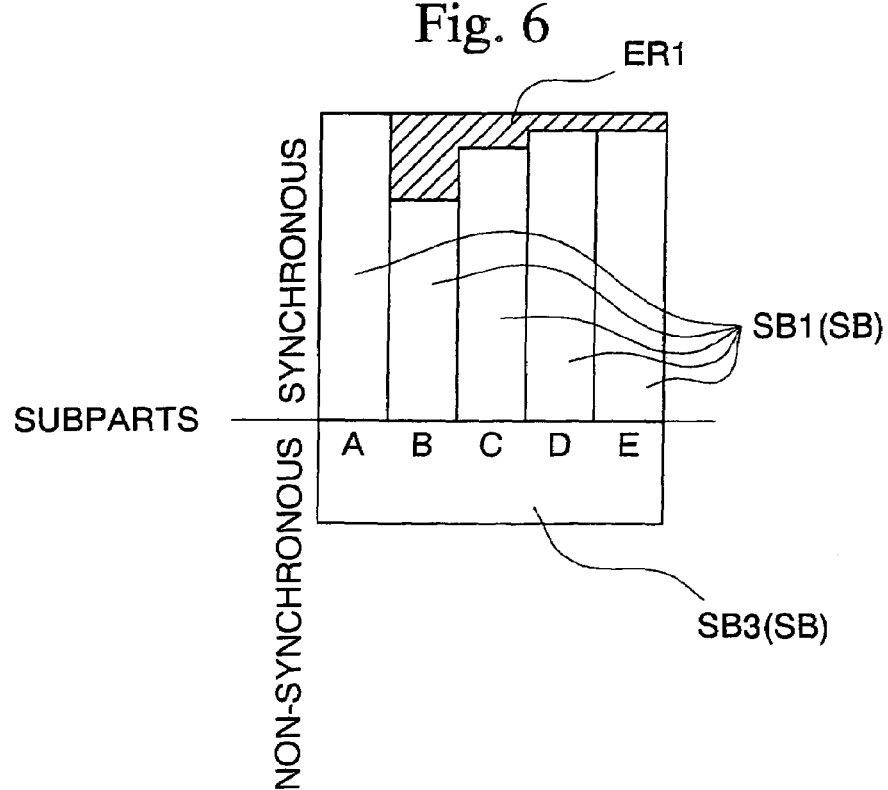
FIG. 6 is a graph showing the collected state of the non-synchronizing subparts among the subparts in one zone.

Practically, the total manhours for the assembly of the new non-synchronous subparts SB3 are allocated to either the manhour deviation R1 of the synchronous subparts SB1 due to the difference of the vehicle types, shown in FIG. 6 by hatching lines or the manhour deviation R2 of the main parts MB due to the difference in the vehicle types, shown in FIG. 7 by hatching lines.

Figure 8:
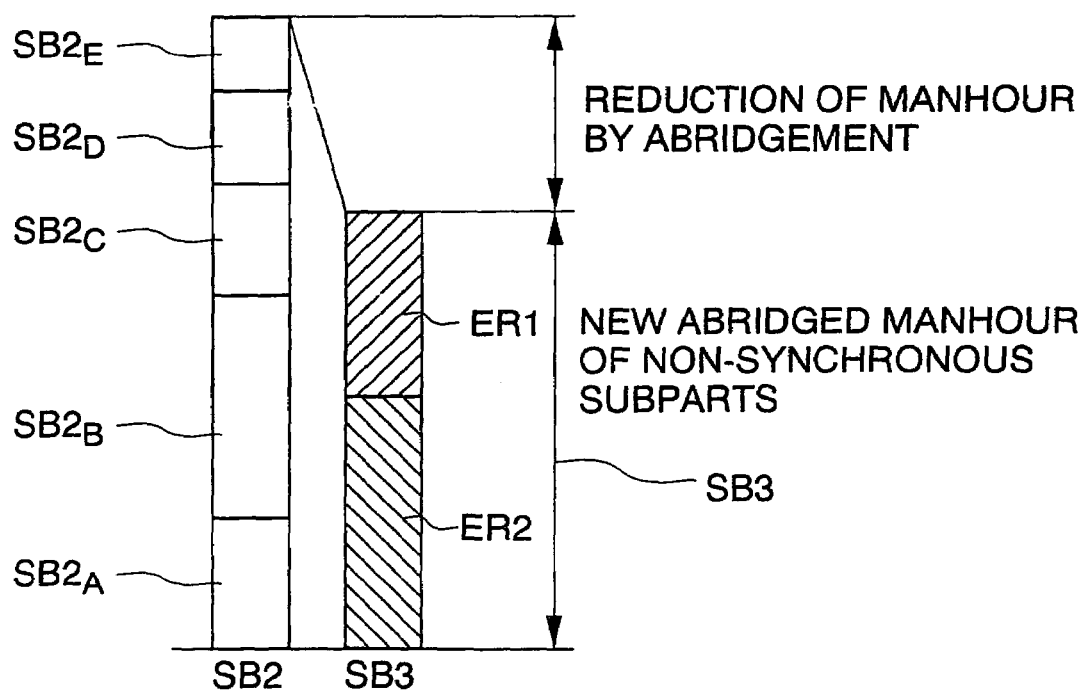
FIG. 8 is a graph showing the abridged result of the assembly manhours of the non-synchronizing subparts.

Here, the total assembly manhours of the non-synchronous subparts SB2 are abridged as shown in FIG. 5 and the total assembly manhours are updated to the new total assembly manhours of the non-synchronous subparts SB3 as shown in FIG. 6, and FIG. 8 shows how to allocate the new total assembly manhours for the non-synchronous subparts SB3 to the manhour deviation R2 of the main parts MB due to the difference of the vehicle types and the manhour deviation R1 of the synchronous subparts SB1 due to the difference of the vehicle types. The non-synchronous subparts SB2 in FIG. 8 show manhours for the non-synchronous subparts for the vehicles from A to E, shown in FIG. 5

According to the present invention, since the assembly manhours for the non-synchronous subparts SB2 are abridged and updated the manhours for the new non-synchronous subparts SB3, it becomes possible to organize a more productive and efficient production line. It is noted that the manhours of the non-synchronous subparts SB3 can be further assigned as the manhour for the non-synchronous subparts in addition to the manhour differences ER1 and ER2.

In the thus organized production line, redundant labor force created by the manhour differences ER2 of the main parts MB due to differences in the vehicle types and the differences in assembly manhour differences ER1 of the synchronous subparts SB1 depending on the vehicle types can be allocated to the assembly operation of the non-synchronous subparts SB2.

That is, some of the operators who are engaged in assembly operations by the main line and the sub-line for one type of vehicles, whose part number is large, become redundant when other types of vehicle, whose parts number is small, are transported on the main line and the sub-lines. That is, the operators become redundant in the main line for the assembly of the main parts, as shown in FIG. 7 and also in the sub-line for the assembly of the subparts SB1, as shown in FIG. 6. However, in the new production line, these redundant operators can be allocated to the new non-synchronous subparts SB3, which is obtained by collecting the non-synchronous subparts and by abridging the collected assembly manhours, so that the new production line does not generate a redundancy of operators.

In a practical process, for example, in the underside assembly zone ZC, when the vehicle body, whose part number is small, is transported on the assembly line, since the assembly manhours are relatively short, redundancy of operators occurs mainly in the rear suspension subassembly conveyer sub-line 14 or in the front suspension assembly subassembly conveyer sub-line 15. However, these operators can be assigned to the assembly operations of the non-synchronous parts in the rear suspension assembly subassembly sub-line 18 or the dressed engine subassembly sub-sub-line 19, which results in eliminating redundancy of manhours.

Accordingly, the production line of the present invention is not only capable of reducing the number of operators when compared with the case of arranging operators in every zones when providing for the vehicle type having the largest number of parts, but is also capable of providing more uniform workload to the operator. It is noted that the design concept of the present invention is highly flexible with respect to increases in the number of vehicle types, although it takes more manhours for classifying the common parts of an increased number of vehicle types.

As a result, the present invention makes it possible to design an efficient production line with a reduced length, which realizes mixed production of a plurality of vehicle types by absorbing differences in production manhours due to vehicle types, and which results in increasing the practical production capacity and reducing the production costs.

Next, an apparatus for organizing the above-described production line is described with reference to FIG. 9.

Figure 9:
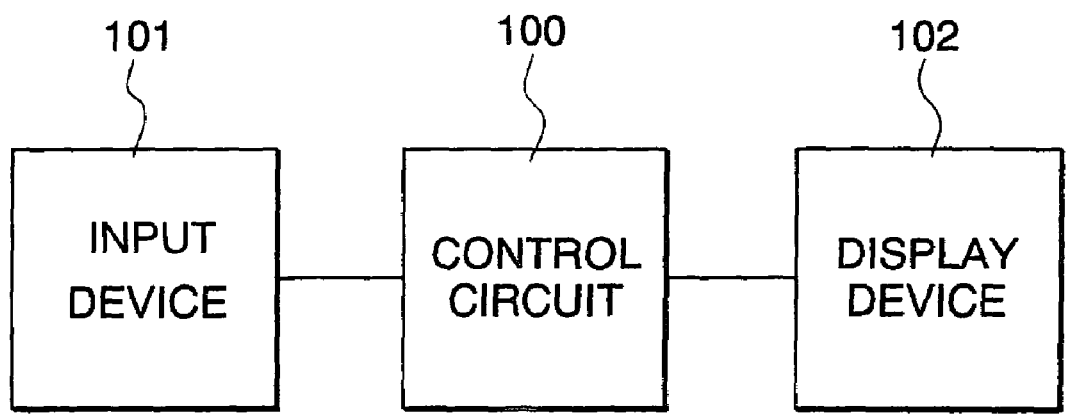
FIG. 9 is a schematic block diagram showing the structure of devices for organizing the production line according to one embodiment of the present invention.

As shown in FIG. 9, this apparatus is provided with a control circuit 100 for storing the flowchart shown in FIG. 3, and an input device 101 for inputting data to the control circuit 100 and a display device 102 for displaying the data output from the control circuit 100 are connected to the control circuit 100.

The data regarding the parts for each type of vehicle is input by said input device 101. The data to be input includes the manhours required for assembling the parts, the components for assembling the part, and the assembly zone for the parts to be handled. When the data is input, the control circuit 100 forms the map of these parts in the form shown in FIG. 2.

Next, when the vehicle type to be assembled in the main line 1 is selected by the input device 101, the control circuit 100 conducts classifying operations in sequence for classifying the main parts (step S1), the subparts (step S2), the synchronizing subparts (step S3), the non-synchronous subparts (step S4), abridgement of the non-synchronous subparts (step S5) and assignment of the non-synchronous subparts (step S6) according to the flowchart shown in the above-described FIG. 3.

The result obtained by the above procedure is displayed on the display device 102, and the operators to be assigned to the non-synchronous subparts are selected.

It is noted that this invention is not limited to the above-described embodiment, and the present invention can be applied not only to the production line for vehicles but also, for example, to production lines of various products such as electrical products.

Figure 10:
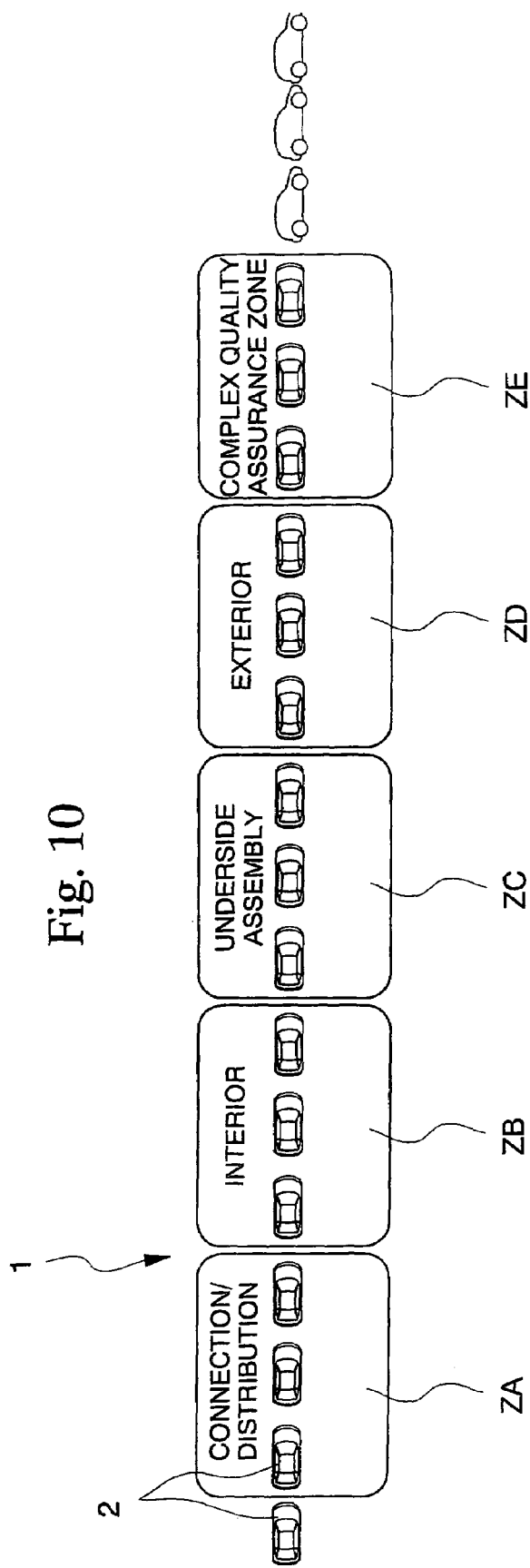
FIG. 10 is a diagram explaining the main line according to an embodiment of the present invention.
Figure 11:
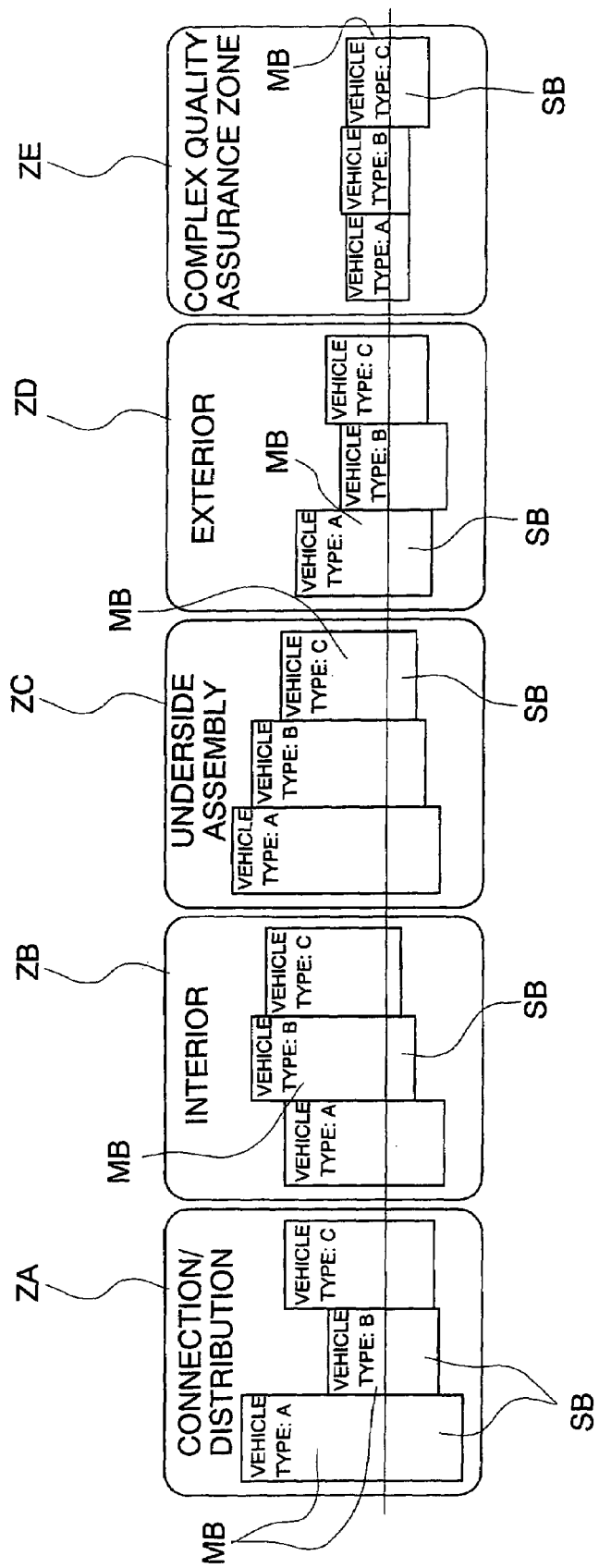
FIG. 11 is a diagram of the main line shown in FIG. 1 explaining the differences in the numbers of parts for a few types of vehicles.

FIG. 10 is a diagram explaining a main line according to an embodiment of the present invention. FIG. 11 is a diagram of the main line in FIG. 10 showing the differences in the number of parts for a few types of vehicles. In FIGS. 10 and 11, reference numeral 1 denotes the main line, which is used for assembling various parts in sequence for a few types of the vehicle bodies 2 conveyed after being coated in the coating process. This main line practically comprises a connection/distribution zone ZA, an interior zone ZB, a underside assembly zone ZC, an exterior zone ZD, and an complex quality assurance zone ZE. The vehicle body after being assembled in the main line 1 is transferred to the subsequent process for inspection. The main line 1 therefore corresponds to the main process.

Here, assembly operations conducted in the connection/distribution zone ZA include, for example, wiring, piping, and wire distribution, operations in the engine compartment, and other pre-assembly operations, and assembly operations in the interior zone ZB include installation of instrument panels, pedals, floor mats, ceiling lining, side linings etc. Assembly operations in the underside assembly zone ZC include assembly of the suspension and the engine, and operations in the exterior zone ZD include installation of tires, the windshields, bumpers, doors, seats, post operations of the engine room and other exterior operations, and operations in the complex quality assurance zone ZE include a coolant filling operation, mounting of the battery, a fuel filling operation, and confirmation of the engine start.

The above-described zones are defined by classifying the functions of the respective operations. Although those operations are conventionally carried out step by step by an operator in charge of the operation, the classification of the operations by their functions and the assurance of functions of those operation for each zone makes it possible to eliminate subsequently disassembling and reassembling of the vehicle. For example, since in the connection/distribution zone the action of the trunk grid switch cable is confirmed by inspecting its operation, it is possible to eliminate the disassembly the assembling in the following zone for repair purposes.

Conventionally, when one operator in charge of a process carries out one process, that is, for example, when one operator attaches the front end of the cable and another operator attaches the back end of the cable, if the first operator attaches the front end without providing slack, this defective attachment may go unnoticed until it is found by another operator and, reassembly may be required when it is found.

Figures 12, 13:
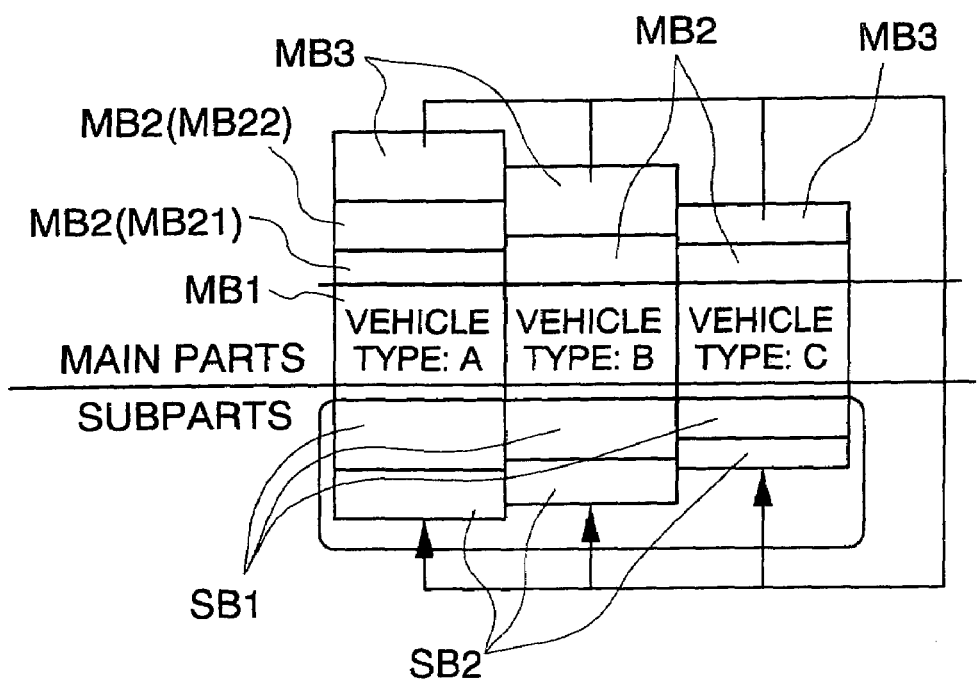
FIG. 12 is a diagram explaining whether each part is used for each type of vehicles.
FIG. 13 is a diagram showing how each part is classified as a main part or a sub-part.

The bar graph for each type of vehicle shown in FIG. 13 illustrates the number of parts, and the part of the bar graph upward above the horizontal line shows the number of the main parts MB, and the part of the bar graph below the horizontal line shows the number of subparts SB. The main parts MB include parts suitable for all types of vehicles, parts whose correct functions are guaranteed in the sub-line, parts to be mounted directly onto the vehicle body, parts which cannot be assembled as a unit, and parts which qualified for the main line. In contrast, the subparts SB includes parts which differ due to the equipment, specifications and the structure of vehicles, parts not directly attached to the vehicle body, parts which can be assembled into a unit, parts which are difficult to attach from a favorable position, parts for which the required manhours can be reduced when they are defined as the subparts, and parts which can be automatically assembled or assembled using jigs when they are defined as subparts.

Now, when the second type of vehicle body 2 is conveyed to each zone, the necessary number of parts for the second vehicle body 2 differs from that used for the first type of vehicle body 1, as shown in FIG. 12. As shown in FIG. 12, the number of parts and the manhours required in the underside assembly zone ZC differ depending on the type of vehicle.

Practically, although the type A of vehicle uses main parts from No. 1 to No. 8, the type B vehicle does not use parts No. 2 and No. 7. The parts for one type of vehicle differ from the parts for the other type of vehicle because of the difference in equipment for each vehicle type. Furthermore, the type C vehicle does not use parts No. 1, No. 4, and No. 6.

That is, the first main parts MB 1 first assembled in the underside assembly zone ZC are main parts No. 3, No. 5, and No. 8, which are common to all types of vehicles including type A, type B, and type C. Examples of those main parts are the suspension and the fuel tank.

The second main parts subsequently used in the underside assembly zone ZC can be classified into two types, one of which is the main parts MB 2, which can absorb the differences in assembly manhours due to the differences in the vehicle types, and another one of which is the main parts MB 3, which cannot absorb the differences in manhours in the assembly operation due to the differences in the vehicle types (these parts MB3 are unitized and assembled in the sub-line). The main parts MB 2 and MB 3 correspond to the remaining main parts No. 1, No. 2, No. 4, No. 6, and No. 7, which are not common to all types of vehicles.

As shown in the vehicle type A in FIG. 13, the main parts defined as MB 2, which can absorb the differences in the manhour due to the difference in the vehicle type, include the main parts MB 21, which can absorb the difference in manhour of the assembly operation due to the differences in the vehicle type by adopting an automatic assembly process or by being assembled later, and the main parts MB22 whose difference in manhours can be absorbed by using jigs, by unifying the specifications, or by improving the assembly operation. Practically, automated assembly systems reduce the manhours by automation, the use of jigs reduces the manhours required in the assembly operation, and the unification of the specifications eliminates the differences based on the differences in the type of vehicle, and the improvement of the assembly operation means to reduce the manhours in the assembly operation by modifying, for example, an operator's positioning in the assembly operation. The improved assembly operations shown above makes it possible to assemble those parts MB 21 and MB 22 in the main assembly line. Practically, those parts MB21 and MB 22 assembled in the underside assembly zone ZC are, for example, a rear suspension mount and a spare-tire carrier.

The parts MB 3, whose differences in manhours in the assembly operation cannot be absorbed, are first assembled in a non-synchronous part mounting area in the sub-line and then supplied to the main line. A practical example of this type of part is a brake sub-assembly supplied to an underside assembly zone ZC.

FIG. 14 illustrates the detailed layout around the underside assembly zone ZC to which a sub-line for assembling a rear suspension RR is connected.

As depicted in FIG. 14, the sub-lines are connected to the main line 1. In the sub-line, since it is possible to supply subparts B1 from the sub-main line in the sub-line after assembling them in the sub-main line 3, the subparts B1 can be supplied to the main line without disturbing the flow of the main line.

In contrast, the subparts B2, which are non-synchronous with the main line 1, and the main part MB 3, which cannot absorb the differences in assembly manhours depending upon the vehicle type and which are sub-assembled with the sub-parts for absorbing the difference in the man-hour due to the vehicle type, are assembled in the non-synchronous part mounting area 4 and stored in the storage area 5, and are supplied to the main line from the storage area when necessary. The storage area functions as an area capable of absorbing the vehicle-type differences. Accordingly, if the number of vehicle types to be supplied to the main line 1 increases, the main line can cope with an increase of the vehicle types without extending the main line.

When two types of vehicle bodies are conveyed by the same main line 1, the operators of the main line 1 engage in assembling the main parts common to both vehicles, so that there are no redundant operators, which results in substantially increasing the productivity. Furthermore, since the operation of the main line for an operator becomes a constant operation irrespective of the differences in the type of vehicle, the operators' skill will reach a high level within a short period, which results in reducing the assembly period and reducing the training period of the operation for each operator.

In the above-described non-synchronous part mounting area 4, since it is possible for the subparts SB to be assembled without synchronizing with the main line 1, an operator, who cannot be engaged in the operations of the main line 1, can be appointed as the operator for the non-synchronous part mounting area 4, so that the load on each operator can be equalized, and personnel can be efficiently distributed depending on the capacity of each operator.

In assembling the main parts MB2, which can absorb the difference in manhours in assembly, and which are assembled on the main line 1, since the manhours for assembly can be reduced in various ways, such as using an assembly jig, adopting an improved operational method, adopting an automated assembly system, and unifying the specifications of vehicles, it is possible to eliminate the loss due to a change of the vehicle type in the main line and to increase the total productivity.

It is noted, however, that the present invention is not limited to the above detailed description of the embodiments. Although explanations are provided mainly on the rear suspensions RR in the underside assembly zone ZC, the methods involved in the present invention can be applied to other parts. Furthermore, the setting of the zones shown above is one example, and the selection of zones is not limited to the above example.

Furthermore, since the operators of the main line can be engaged in the assembly operation even when a different type of vehicle is conveyed, there will be no redundant operators and the productivity can be increased. At the same time, since operators who cannot be engaged in the assembly operations in the main line can be operators of the assembly operation in the non-synchronous manufacturing area, the productivity can be maintained at a high level without imposing excess loads on the operators, which results in arranging operators to suitable positions depending on their capabilities.

What is claimed is:

1. An assembly method of a plurality of types of vehicle bodies for assembling main parts and subparts onto vehicle bodies on a single main line while conveying the vehicle bodies comprising the steps of:

assembling in a main process, first main parts which are common to all types of vehicle bodies, and second main parts which are not common to all types of vehicles but whose assembly can be accommodated in the main process by absorbing a difference in assembly man-hours required for the assembly of only the first main parts and the assembly man-hours required for the assembly of the first and second main parts depending on the vehicle type;

assembling in a subprocess, third main parts which are not common to all types of vehicles and whose assembly cannot be accommodated in the main process by absorbing the difference in assembly man-hours required for the assembly of only the first main part and the assembly man-hours required for the assembly of the first and third main parts due to the vehicle type, as a unit of parts;

supplying to the main process, first subparts which can be assembled synchronously with the main line, after assembly in a sub-main process;

storing after assembling in a non-synchronous parts area, second subparts which cannot be assembled synchronously with the main line, and said third main parts whose assembly cannot be accommodated by absorbing the difference in man-hours depending on the vehicle type; and supplying said second subparts to the sub-main process and said third main parts to the main process.

2. A method for assembling a plurality of types of vehicle bodies according to claim 1, wherein, the differences in assembly man-hours of the second main parts due to difference in the vehicle type, whose assembly can be accommodated while conveying on the main line, are absorbed by methods such as use of assembly jigs that reduce the assembly man-hours, improvement of the assembly operation, and adoption of an automatic process and unification of specifications.

* * * * *